United States Patent
Wakefield, Jr. et al.

(10) Patent No.: US 9,782,626 B2
(45) Date of Patent: Oct. 10, 2017

(54) SYSTEM FOR REMOVABLY MOUNTING PROPRIETARY EQUIPMENT IN A TREE STAND

(71) Applicant: ODIN Hunting Products, Inc., Brandon, SD (US)

(72) Inventors: Timothy A Wakefield, Jr., Brandon, SD (US); Zachary L Dawson, Valley Springs, SD (US); Blake B Hoffman, Brandon, SD (US)

(73) Assignee: Odin Hunting Products, Inc., Brandon, SD (US)

(*) Notice: Subject to any disclaimer, the term of this patent is extended or adjusted under 35 U.S.C. 154(b) by 0 days.

(21) Appl. No.: 14/591,200

(22) Filed: Jan. 7, 2015

(65) Prior Publication Data
US 2015/0196806 A1    Jul. 16, 2015

Related U.S. Application Data

(60) Provisional application No. 61/926,492, filed on Jan. 13, 2014.

(51) Int. Cl.
*A01M 31/02* (2006.01)
*A63B 27/02* (2006.01)
*A63B 27/00* (2006.01)
*E06C 9/04* (2006.01)

(52) U.S. Cl.
CPC ............. *A63B 27/02* (2013.01); *A01M 31/02* (2013.01); *A63B 27/00* (2013.01); *E06C 9/04* (2013.01)

(58) Field of Classification Search
CPC .................. A01M 31/02; E06C 9/04
See application file for complete search history.

(56) References Cited

U.S. PATENT DOCUMENTS

| | | | |
|---|---|---|---|
| 6,269,906 B1* | 8/2001 | Dockter | E06C 5/00 182/92 |
| D633,779 S | 3/2011 | Bennett et al. | |
| 8,157,230 B2* | 4/2012 | Krueger | A47B 96/068 248/220.43 |
| 8,439,162 B1* | 5/2013 | Galloway | E06C 1/381 182/100 |
| 2014/0020979 A1 | 1/2014 | Squires | |

OTHER PUBLICATIONS

Printout of webpage at URL http://www.hurricaness.com/powerstep/. Downloaded Jan. 7, 2015.

* cited by examiner

*Primary Examiner* — Alvin Chin-Shue
(74) *Attorney, Agent, or Firm* — Etherton Law Group, LLC

(57) ABSTRACT

A system for removably mounting tree steps and other equipment in tree stands. The system comprises a permanent universal bracket and a series of removable equipment mounts attachable to it. The bracket is attached to the tree by inserting a bolt through one or more apertures in the bracket. One or more cleats extends from the bracket into the tree to prevent the bracket from rotating around the bolt. A channel in the bracket is as adapted to receive one or more mated extensions that extend from each mount. The extensions are flexible and resilient such that they can be deformed to facilitate attaching and removing the mount from the bracket. In the preferred embodiment, the mount is a step having two extensions, each insertable into a mated channel on the bracket.

14 Claims, 15 Drawing Sheets

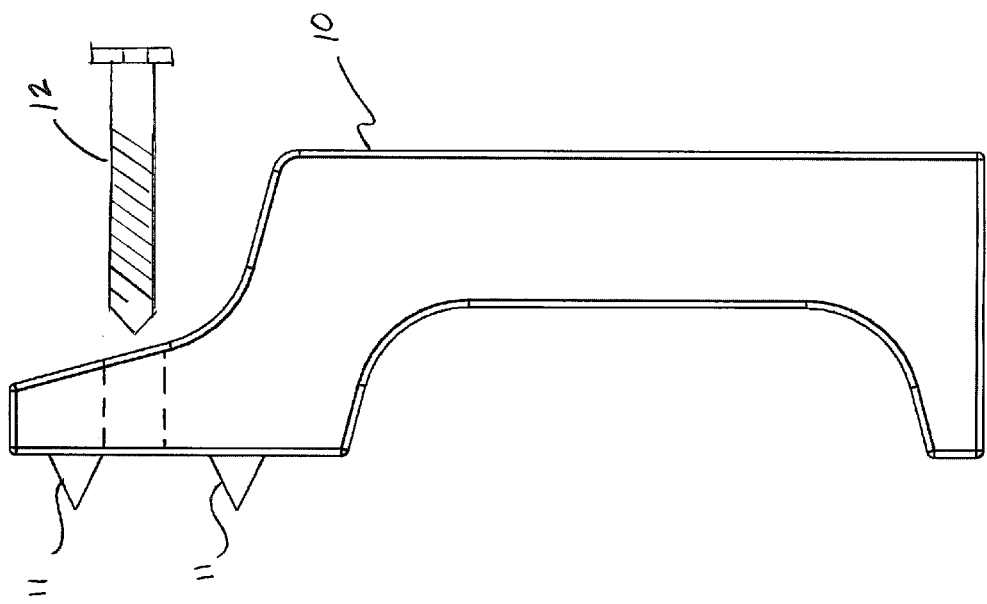

SYSTEM FOR REMOVABLY MOUNTING PROPRIETARY EQUIPMENT IN A TREE STAND

CROSS-REFERENCE TO RELATED APPLICATIONS

This application claims the benefit of U.S. Provisional Application No. 61/926,492 filed Jan. 13, 2014.

FIELD OF INVENTION

This invention relates generally to hunting tree stands and more particularly to a system for a hunter to mount equipment in his own tree stand and keep others out.

BACKGROUND

Tree stands are open or enclosed platforms secured in trees to give a hunter or wildlife observer a better vantage point of wildlife on the ground. Hunters may mount gear in the tree stand, such as a camera, seat, bow or gun holder. Being elevated, it's necessary to use a ladder or steps to climb the tree to mount the stand in the tree, carry gear up to it, and use it. Because tree stands are often in relatively inaccessible locations where wild animals roam, it's advantageous for the ladders or steps to be easily portable.

Various methods of mounting steps to the trees have been developed. The most simple involves screwing several lag bolts into a tree by hand at increasing heights. Straight, L-shaped, or Z-shaped lag bolts are common. Of course, climbing a tree by stepping on slender bolts is not easy, especially when one is carrying gear and his boot soles are wet. For a better foothold, L-shaped steps with a wider tread have been devised that are attached to a tree by screwing a lag bolt through an aperture in the vertical portion of the L. These provide better foothold, except that the steps often rotate around the bolt as varying torque is applied when climbing. Clearly an improved step is desired.

It's often desirable to locate a tree stand near animal trails or other sites well-traveled by game. The best sites are limited by the location and whether there's a desirable tree at that location. Unfortunately, the best sites are popular for all hunters and wildlife aficionados, which makes it likely that many hunters will want to use the same desirable site. In some states the law expressly permits a hunter to use someone else's tree stand if it's on public land. This sets up a situation in which one hunter spends a significant amount time and effort to find a good site and set up his tree stand, only to come back later and find some other hunter using it. It would be desirable to be able to set up a stand and be able to re-use it during a season or even in subsequent seasons, while preventing others from using it. Another desire is to be able to set up tree stands in multiple locations and take various accessories from stand to stand as desired, without removing and replacing the stands each time. For example, a tree stand may be set up in one spot for deer hunting and in another spot for elk hunting, yet the hunter will want to use the same seat and bow holder at each stand. Conventional tree-stands would require a hunter to removing and replacing the stand at each spot each time and have duplicate equipment in each tree stand.

Therefore, it is an object of this invention to provide an apparatus to enable a hunter to removably mount desired equipment in a tree stand while preventing others from using the equipment.

SUMMARY OF THE INVENTION

This invention is a system for removably mounting tree steps and other equipment in tree stands. The system comprises a permanent universal bracket and a series of removable equipment mounts attachable to it. The bracket is attached to the tree by inserting a bolt through one or more apertures in the bracket. One or more cleats extends from the bracket into the tree to prevent the bracket from rotating around the bolt. A channel in the bracket is as adapted to receive one or more mated extensions that extend from each mount. The extensions are flexible to some degree and resilient so that they can be deformed to facilitate attaching and removing the mount from the bracket. In the preferred embodiment, the mount is a step having two extensions, each insertable into a mated channel on the bracket.

BRIEF DESCRIPTION OF THE DRAWINGS

FIG. 1 is a side view of a first embodiment of a bracket.

DETAILED DESCRIPTION OF THE INVENTION

Figure 2A:
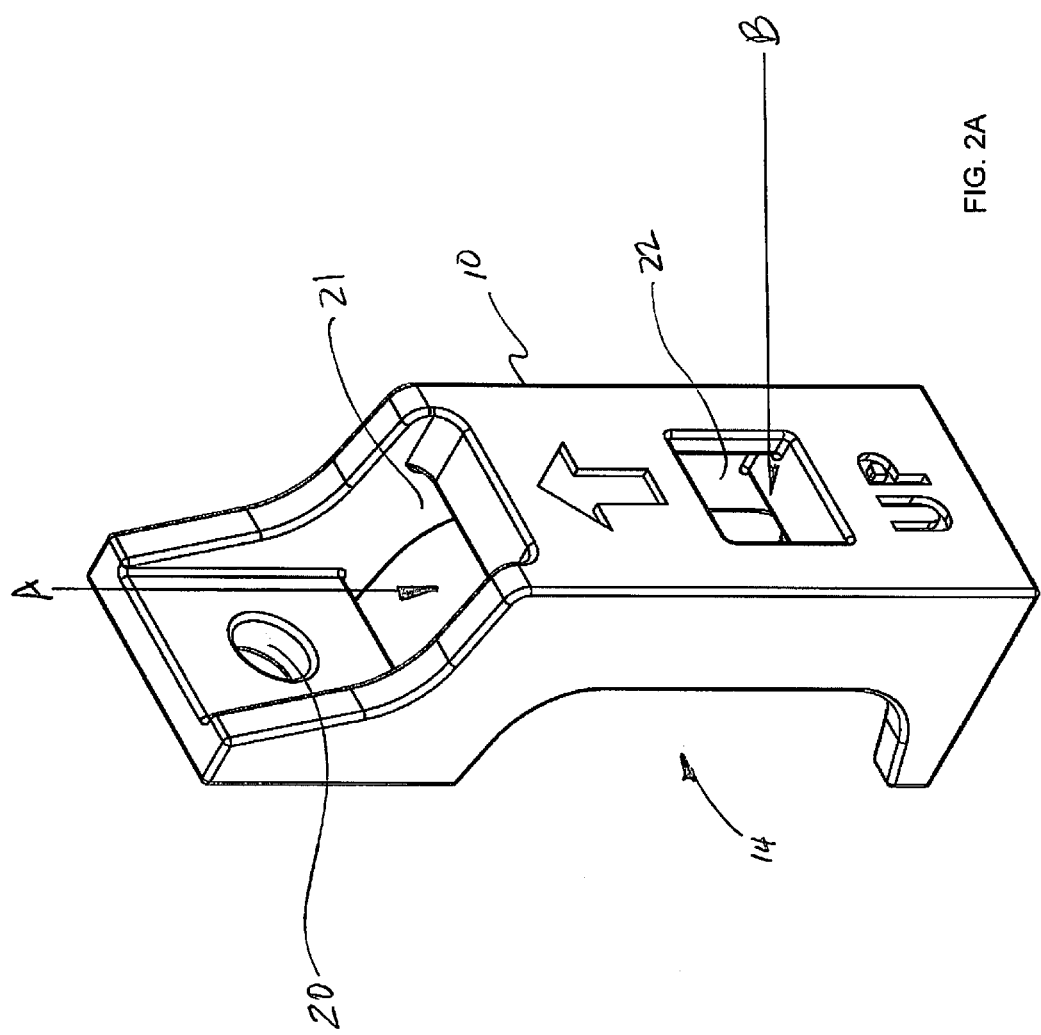
FIG. 2A is a perspective view of the bracket of FIG. 1.
Figure 2B:
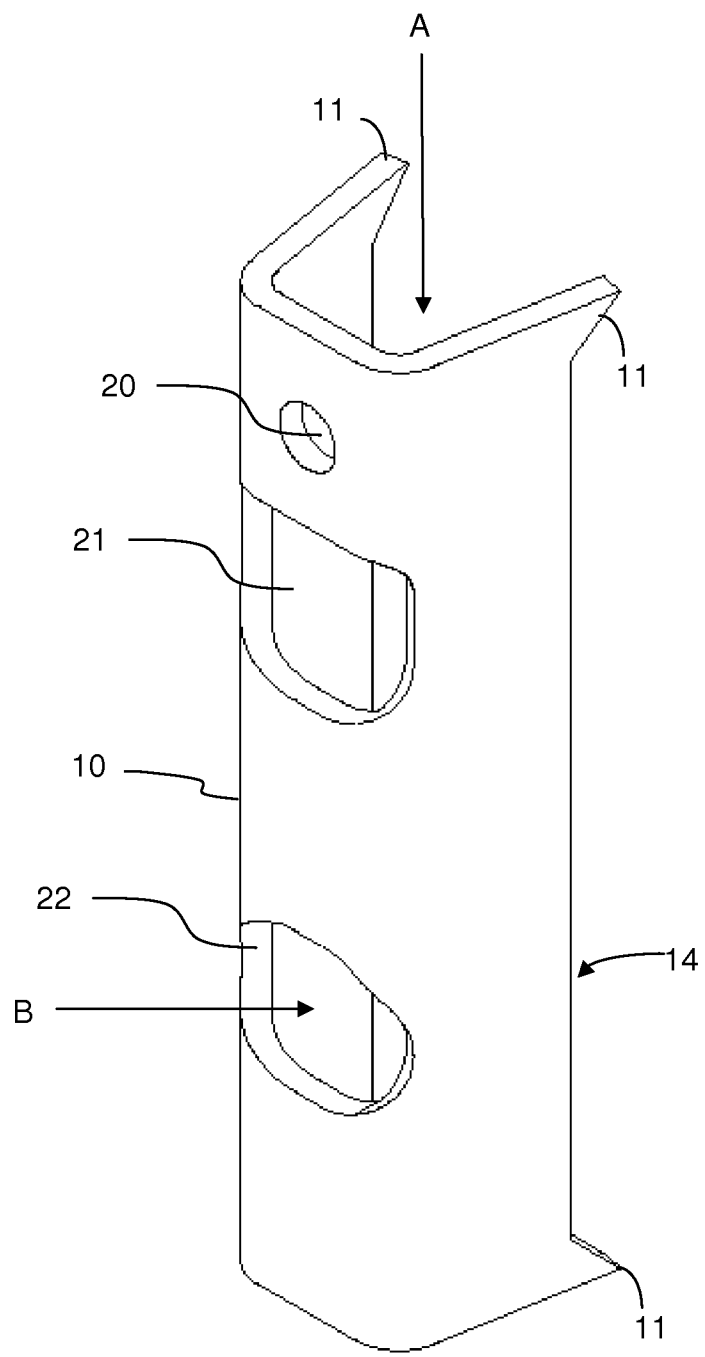
FIG. 2B is a perspective view of a second embodiment of a bracket.

This invention is a system for removably mounting tree steps and other equipment in tree stands which uses a bracket universal to all types of mated equipment. FIGS. 1, 2A and 2B illustrate the bracket 10. The bracket 10 is attached to a tree at a desired location by inserting a fastener through one or more bolt apertures 20 in the bracket 10 and into the tree. Preferably the fastener is threaded, such as a lag bolt or construction screw, because the threads help secure the bracket to the tree more than if the fastener is not threaded. However, non-threaded fasteners such as nails may suffice. The fastener will be referred to herein as a bolt 12, regardless of whether it is threaded or not. A washer (not shown) can be placed between the head of the bolt 12 and the bracket 10, as known in the art, to help distribute the load on the bolt and more securely attach the bracket to the tree. The bolt can be tightened with a battery-powered drill or a ratchet wrench. Alternatively, the bracket 10 can be self-tapping, with a threaded portion extending from the back of it that is screwed to the tree.

Figure 11A:
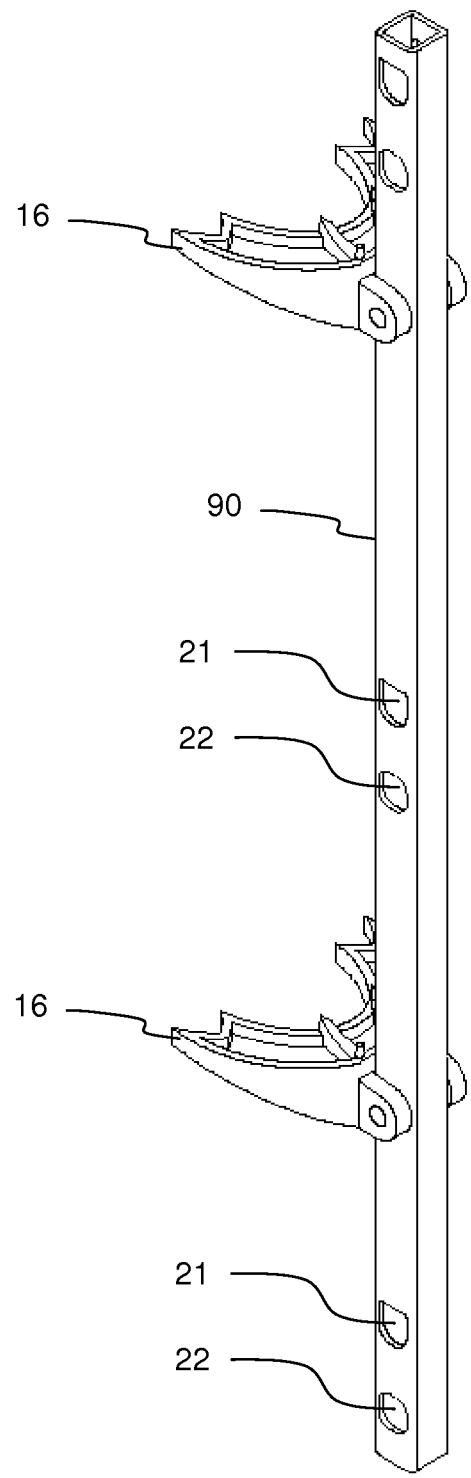
FIG. 11A is a perspective view of a climbing stick.
Figure 11B:
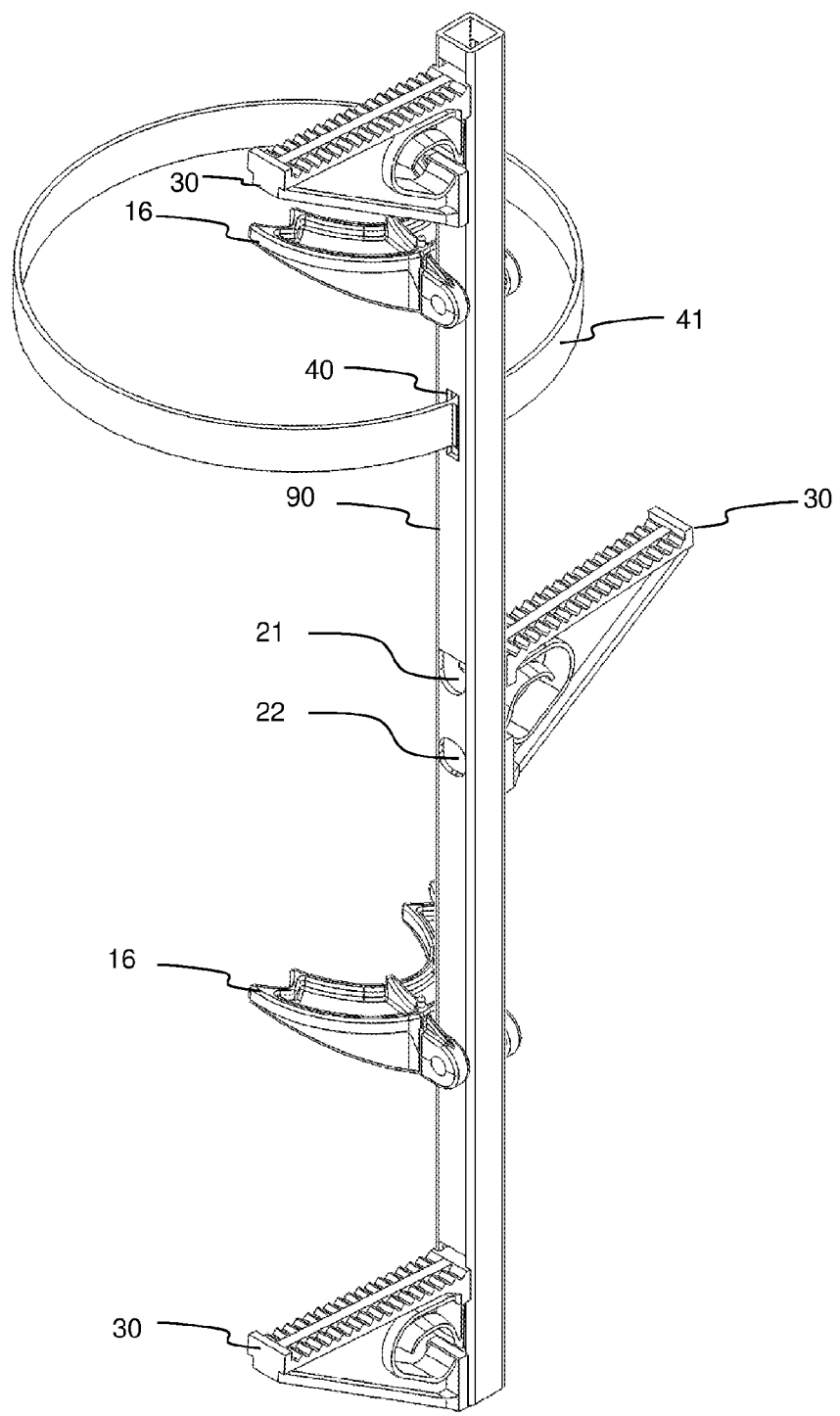
FIG. 11B is a perspective view of the climbing stick with steps mounted thereto.

The bracket can be any length. For most applications the bracket 10 will have only one pair of mount apertures, as shown in FIGS. 2A and 2B. For locations in which it is impossible or otherwise not permissible to sink fasteners into a tree, the bracket 10 can be attached to the tree using a screw-less, self tightening strap which uses leverage to tighten the strap. The bracket 10 may be configured with an aperture 40, such as a slot or hole, for receiving the strap 41. Alternatively a footman's loop can be securely attached to the bracket, such as by riveting, and the strap can be threaded through the loop. FIGS. 11A-B show a longer bracket having a plurality of mount apertures 21 and 22 used as a climbing stick 90. Projections 16 may be attached to the stick 90 to enable the stick 90 to be spaced a distance from the tree to make it easier to step on an attached step 30. The projections 16 may be rotatable to a position parallel to the stick 90 to make the stick smaller for easier transport.

To ensure that the bracket 10 does not rotate around the bolt 12 when torque is applied to it, the bracket 10 has one or more projecting pieces of metal, rubber, or other material, referred to herein as cleats 11, designed to stabilize the bracket 10 against the tree when the bolt 12 is tightened. FIG. 1 shows two cleats 11 extending from the bracket 10. The curved gap 14 on the bracket 10 allows for clearance to grab and hold it while attaching it to the tree. Additionally the gap 14 enables the bracket 10 to be made with less material than if it were solid, resulting in less expensive manufacturing and shipping.

A channel in the bracket 10, indicated by arrow A in FIGS. 2A and 2B, is as adapted to receive one or more mated extensions extending from a mount. Each mount has the general shape of a right triangle having a leg 35, a hypotenuse 36, and a base 37. The base 37 is not continuous along its length, the discontinuity working to allow the leg 35 and hypotenuse 36 to be deformed toward each other to facilitate easy attachment and removal of the mount to and from the bracket 10.

Figure 3:
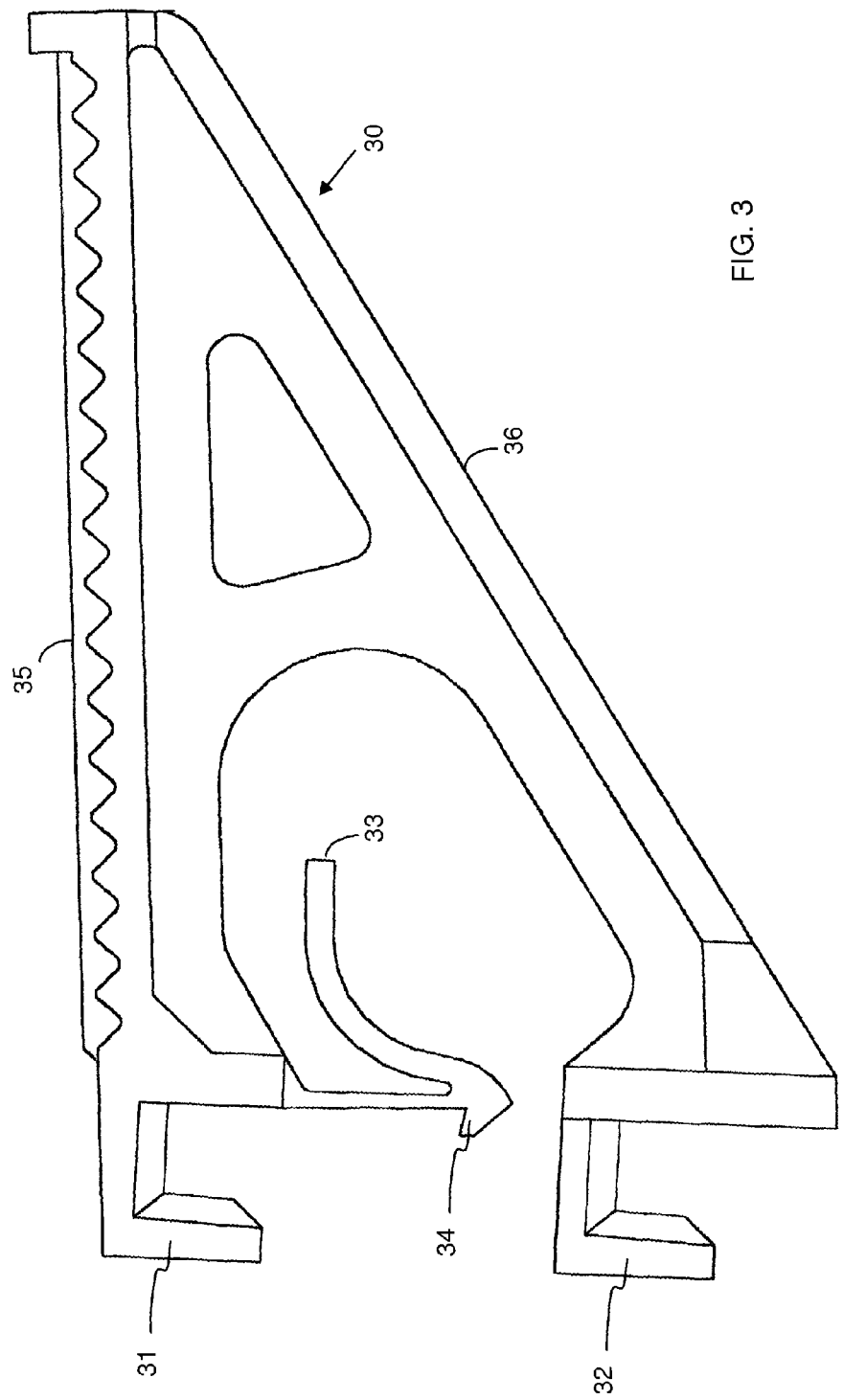
FIG. 3 is a side view of a step.
Figure 4:
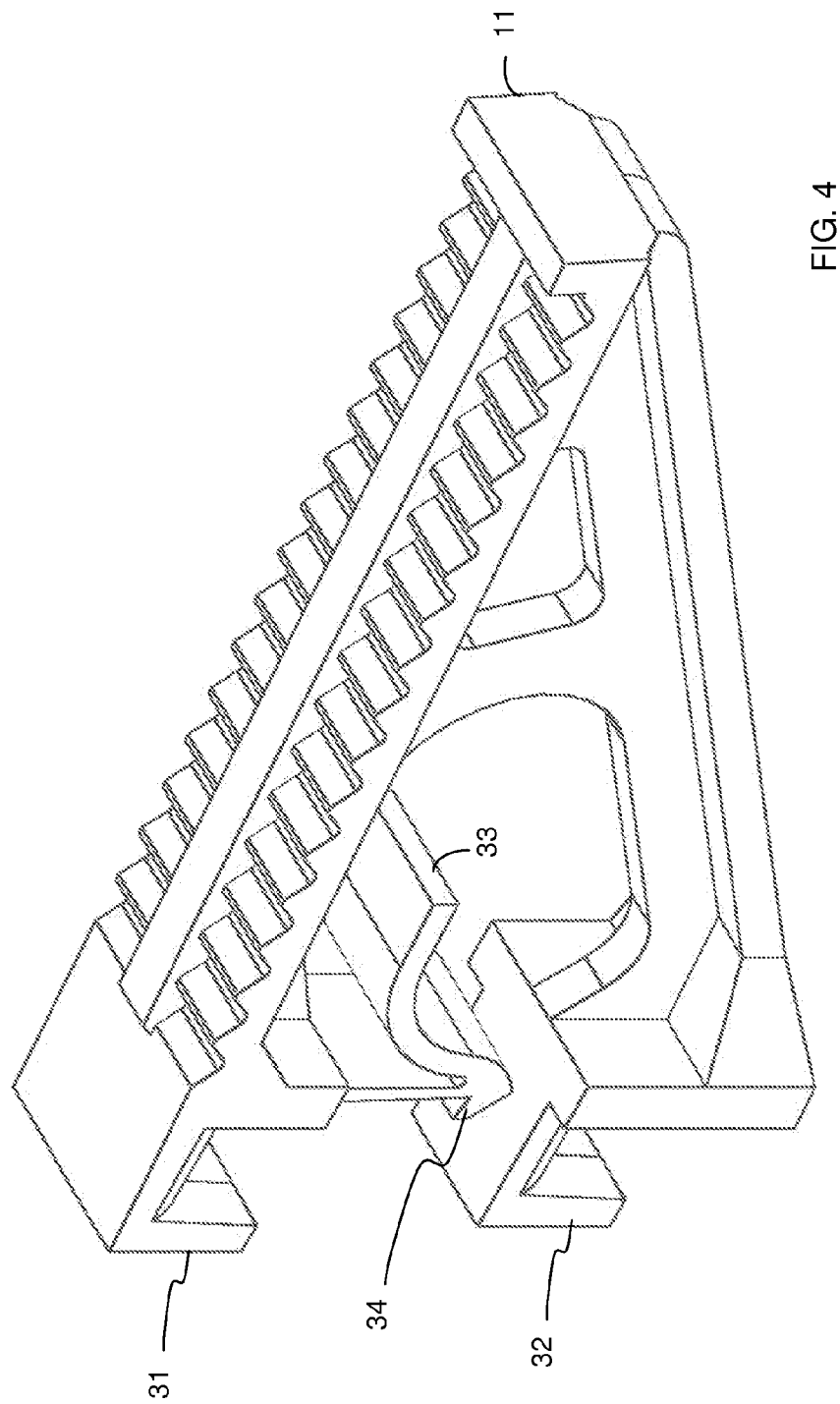
FIG. 4 is a perspective view of the step of FIG. 3.

In a preferred embodiment, the mount has two extensions 31 and 32, each insertable into the channel on the bracket 10. See FIG. 3 which shows the step 30 as the mount. The first extension 31 extends from the base 37 of the mount near the leg 35 of the triangle. The second extension 32 extends from the base 37 of the mount near the hypotenuse 36 of the triangle. The first extension 31 is inserted into first mount aperture 21 and the second extension 32 is inserted into second mount aperture 22, as shown by arrow B in FIGS. 2A and 2B. Once inserted the mount is pushed downwards until the extensions rest securely in the apertures.

Figure 5:
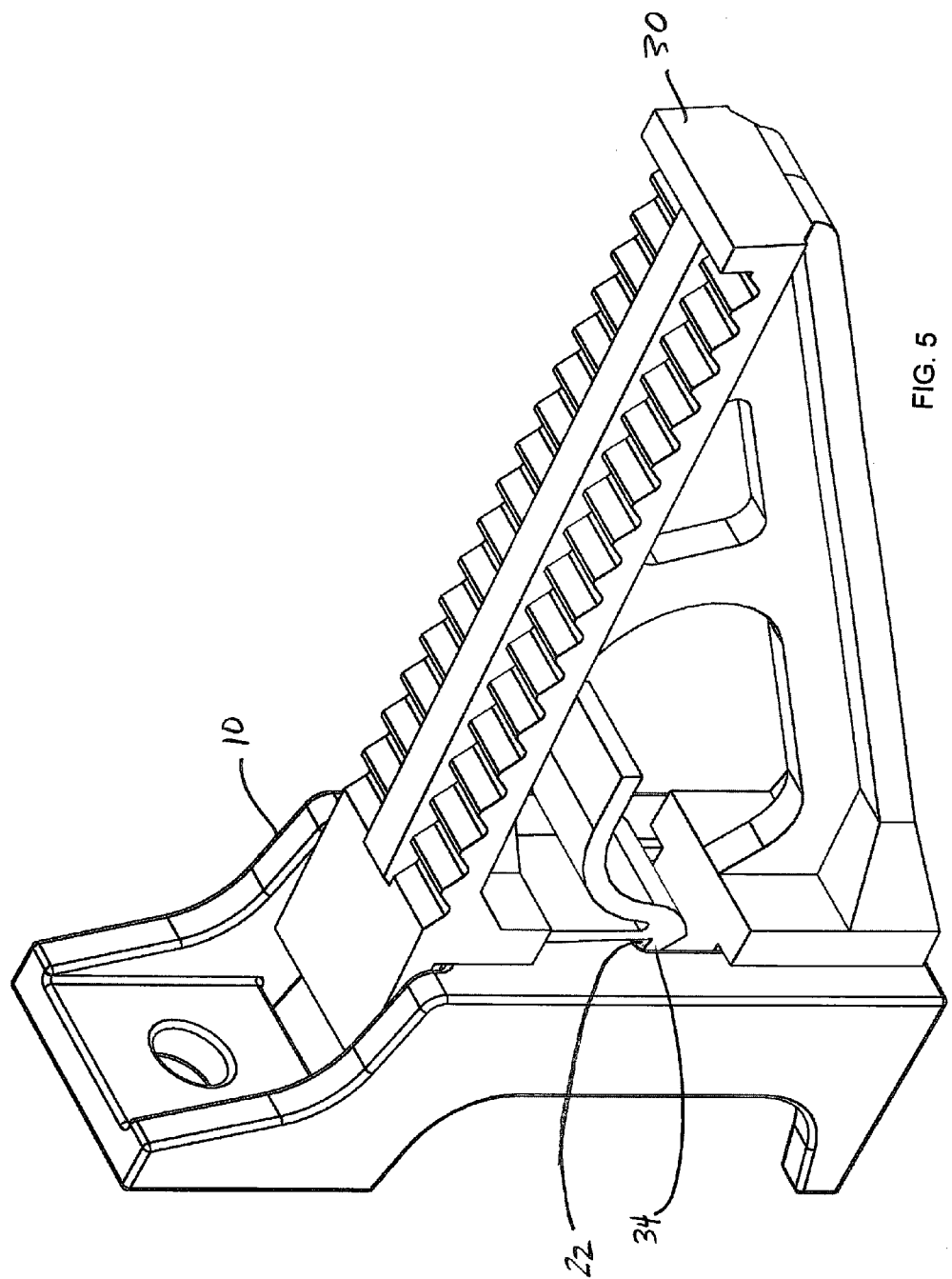
FIG. 5 is a perspective view of the step and bracket assembled.

In one embodiment the mount further comprises a trigger 33 terminating in a nub 34. When the mount is forced onto the bracket 10, the nub 34 bends away from the bracket until it clears the first mount aperture 21 and snaps into place into the second mount aperture 22, just above the second extension 32. The trigger 33 is shown in FIGS. 3-5 and 9. FIG. 5 shows the bracket 10 and a mount assembled. To release the mount from the bracket 10, the trigger 33 is squeezed towards the top of the mount, causing the nub 34 to be pulled out of the second mount aperture 22 to release the extensions from the mount apertures. In another embodiment, the mount does not have a trigger 33 but instead the leg 35 and the hypotenuse 36 of the mount can be squeezed together to release the extensions 31 and 32 from the mount apertures 21 and 22. The trigger 33 can be protected with a trigger guard to make it more difficult to accidentally dislodge the mount.

Mounts for any purpose can be used with a given bracket 10. FIGS. 3-6 show the mount as a step 30. The leg 35 of the step 30 has gripping structures on the leg such as notches, raised bumps, knurled patterns or other deformations that provide a secure footing for a user. In a preferred embodiment, the steps 30 are packaged for conveniently transporting them to and from a tree stand. For example, the steps 30 can be packaged in a square, re-useable plastic pail.

The cantilever shape of the mount enables it to hold a significant amount of weight. The shape in combination with the chosen material helps determine how much load can be borne by the mount. The brackets are made of a rigid, weather-resistant material; mounts are made of a resilient, weather resistant material. Materials to be used include polymers, glass-filled nylon, cast aluminum, or cast zinc. The brackets and mounts made be made of different colors. For example they can be made in brown or green to camouflage the devices, or in fluorescent orange to increase visibility of the devices.

Preferably the mounts also employ a fail-safe design that causes the mount to break away when impacted by sufficient force, such as when a hunter falls against a mount, so that the hunter is not impaled by the mount. The mount may be made to break away by limiting the thickness of the extensions 31 and 32 such that it is strong enough to support a hunter or his gear plus a safety margin, yet breaks away when impacted with sufficient force above that safety margin. For example in an embodiment of step mounts, each step 30 is designed to hold about 1000 lbs but break under about the maximum weight a hunter's safety harness would hold in fall, which is about 1500 lbs. Alternatively the bracket 10 can be made to break away at the point is secured to the tree or at the mount aperture that holds the extensions.

Figure 6:
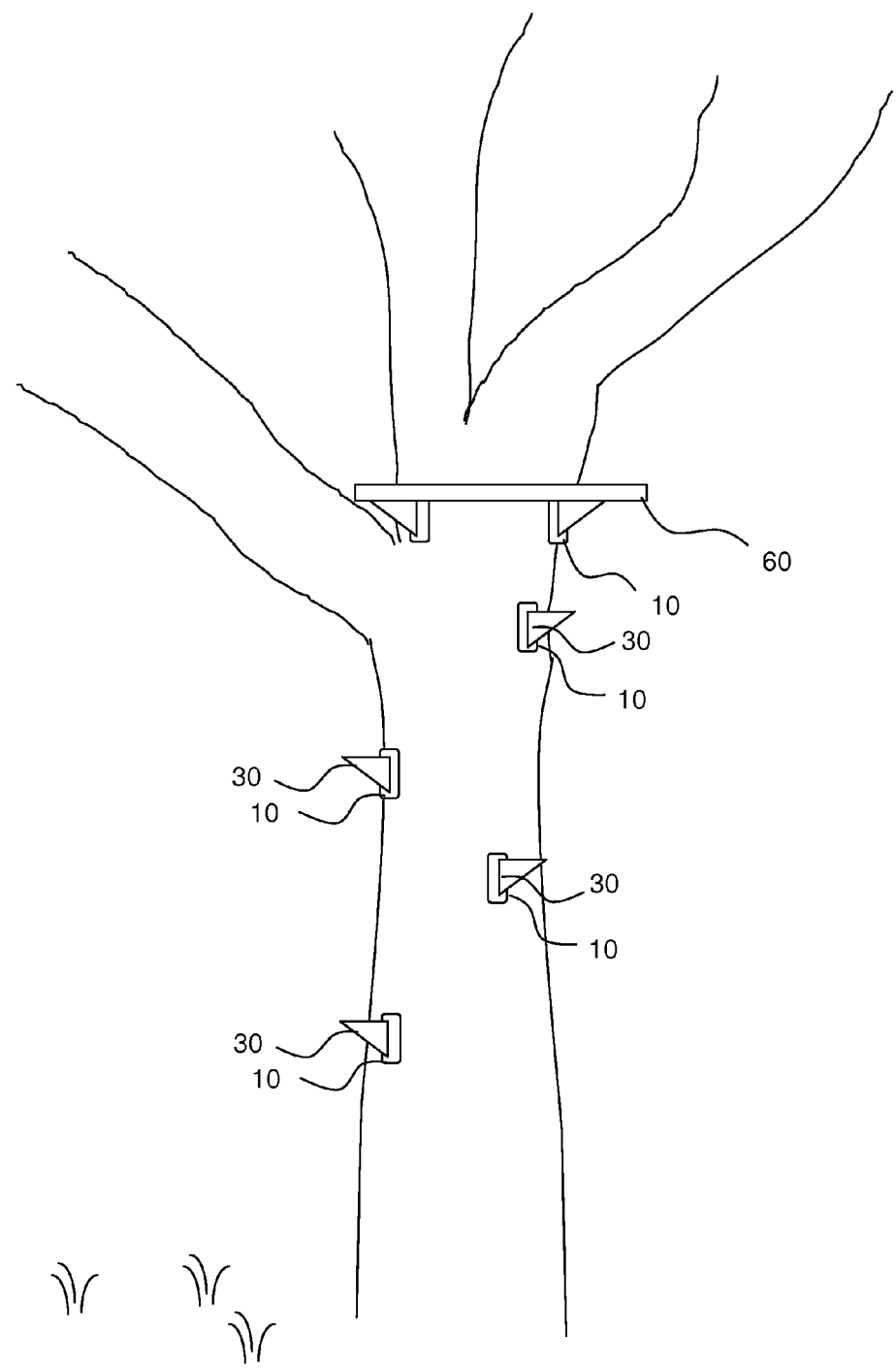
FIG. 6 illustrates a tree with steps and a seated mounted thereto.
Figure 8A:
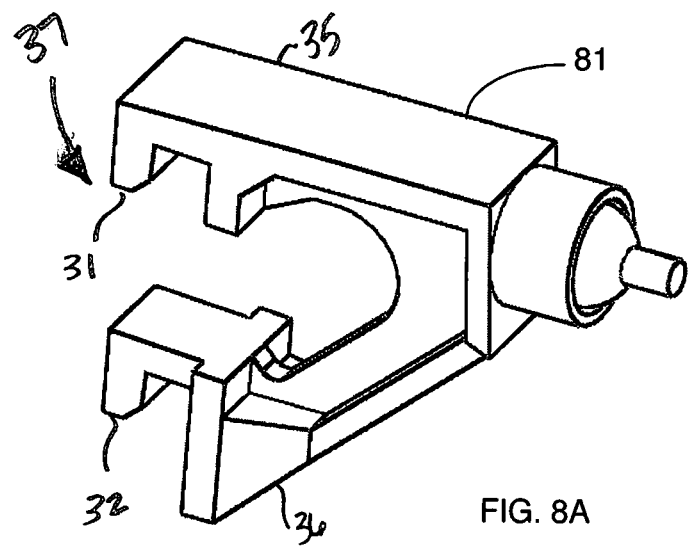
FIG. 8A is a perspective view of a camera holder.
Figure 8B:
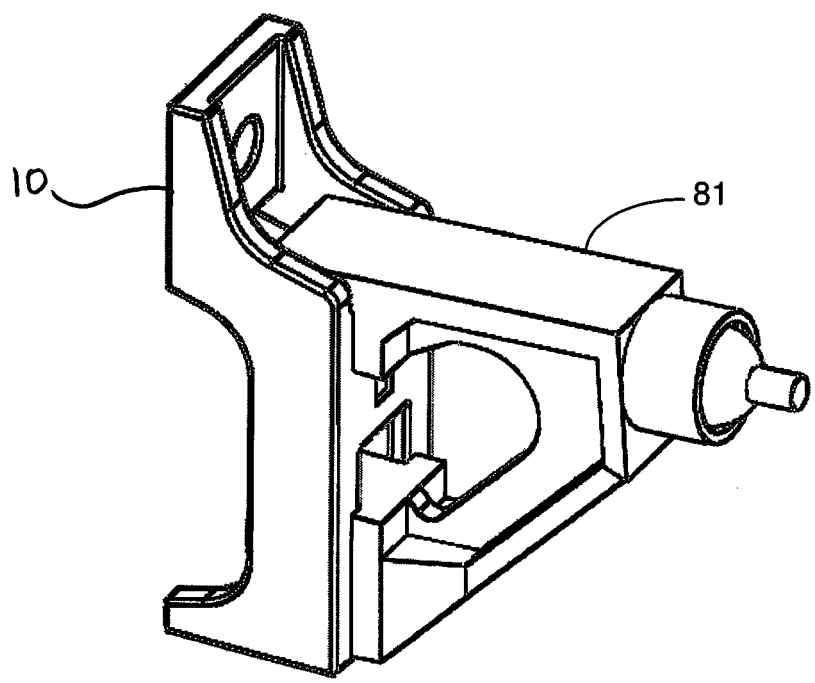
FIG. 8B is a perspective view of the camera holder and bracket assembled.
Figure 9A:
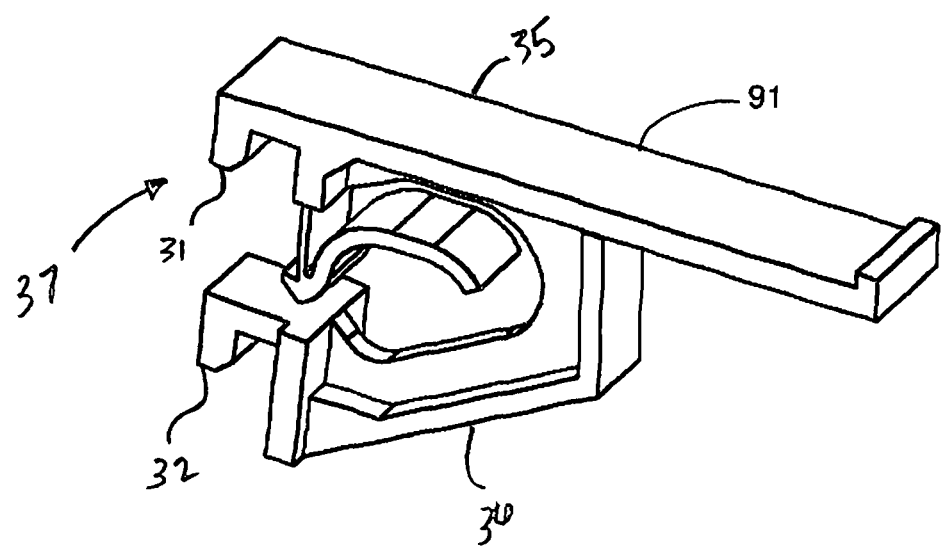
FIG. 9A is a perspective view of a first embodiment of a bow holder.
Figure 9B:
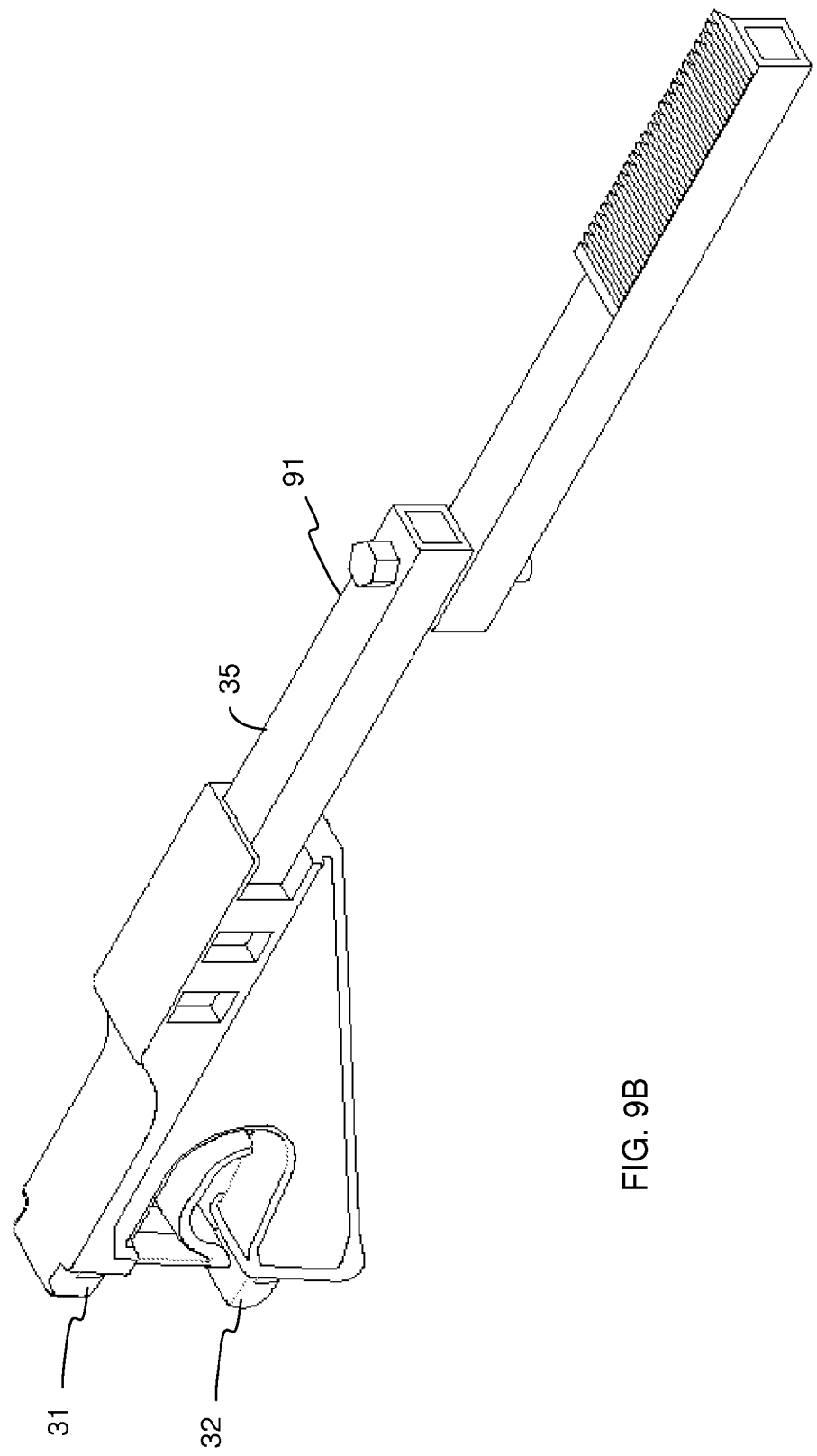
FIG. 9B is a perspective view of a second embodiment of a bow holder.
Figure 10A:
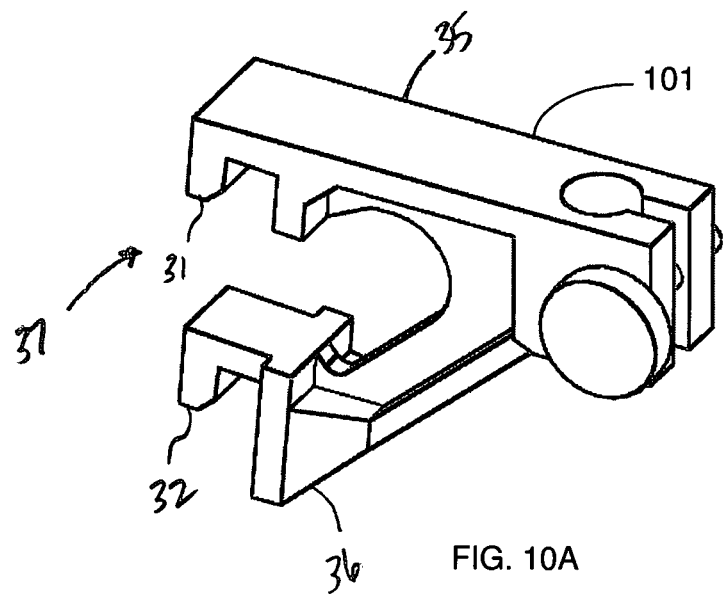
FIG. 10A is a perspective view of an umbrella holder.
Figure 10B:
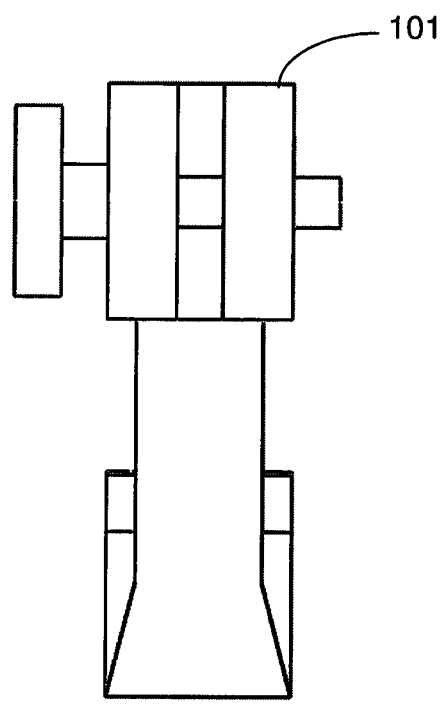
FIG. 10B is a front view of the umbrella holder.

Brackets are used with an array of interchangeable mounts. Other types of mounts include those for a camera, bow holder, umbrella, gun holder, footrest, skirt, platform, and seat, all of which attach to bracket 10 with mated extensions. FIG. 6 illustrates four steps 30 and a seat 60 mounted to a tree using the present system. FIGS. 8A and 8B illustrate a camera holder 81 and assembled camera mount, respectively. FIG. 9A illustrates a bow holder 91 having a standard length leg 35. FIG. 9B illustrates a bow holder 91 having an extendable and rotatable leg 35. The bow holder 91 may include one or more rails for mounting accessories and attachments. The rails can be mounted on up to all four sides of the leg 35. The rails are preferably Pictanini or Weaver rails which are standardized to mount mated accessories. FIGS. 10A and 10B illustrate an umbrella holder 101.

The channel and mount apertures are mated to the extensions. For example, the distance between the first mount aperture 21 and the second mount aperture 22 is the same as the distance between the first extension 31 and the second extension 32. The extensions are sized to fit snugly in the mount apertures. If the shapes and sizes do not match, the mount falls out of the bracket, rendering it useless. The mated parts ensure that only those who have the mated mounts can use the brackets, which enables a hunter set up a stand and be able to re-use it during a season or even in subsequent seasons, while preventing others from using it. Similarly, a hunter can set up multiple tree stands in multiple areas and re-use a single set of mounts on every stand. This reduces the number of mounts a hunter has to buy. To further reduce the likelihood that another hunter would coincidentally have mated mounts thus allowing him to poach another's tree stand, various versions of the mated brackets and mounts may made with different distances or differently-sized extensions and apertures, such that only the mated mount will fit into its mated bracket.

Figure 7A:
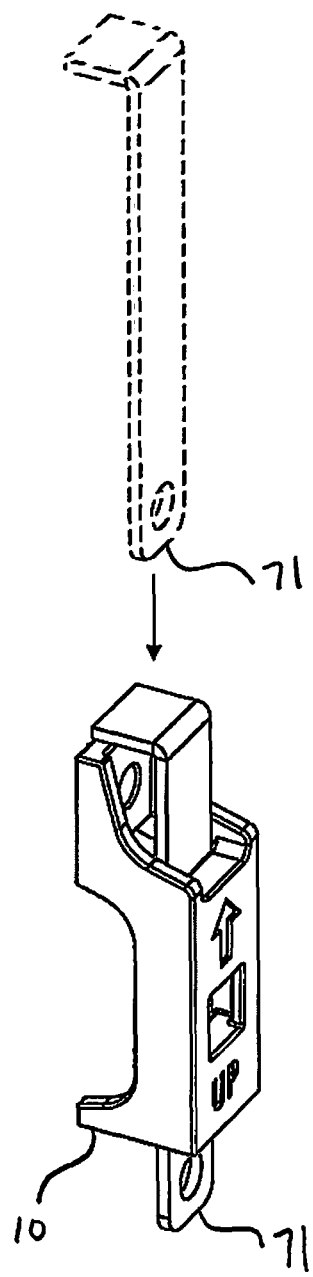
FIG. 7A is a perspective view of first embodiment of a lock assembly.
Figure 7B:
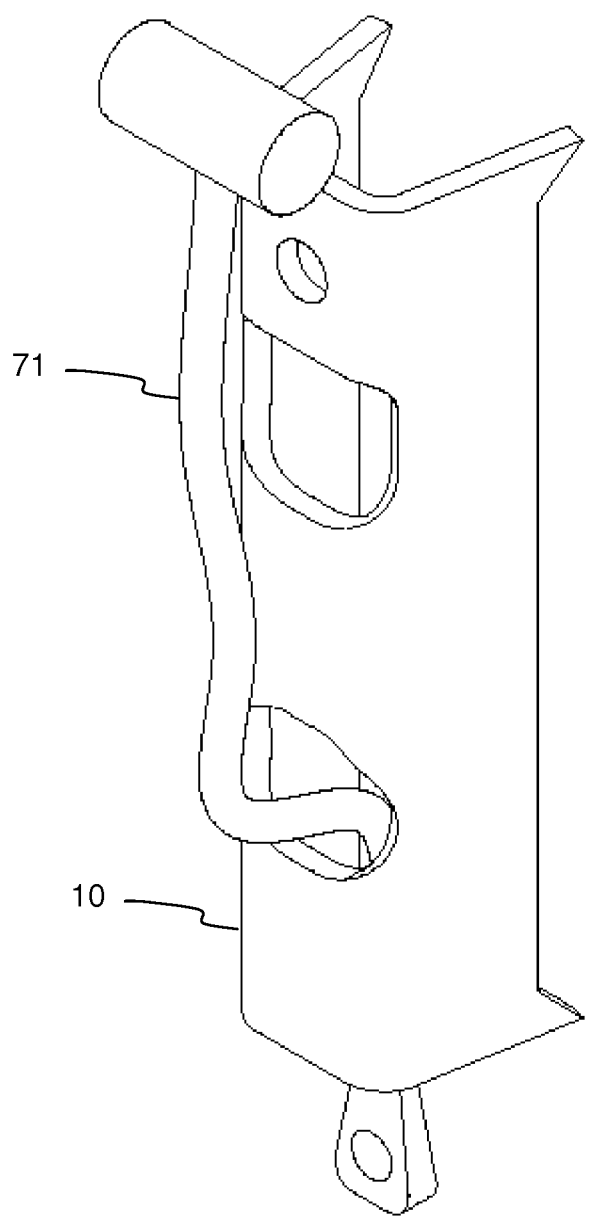
FIG. 7B is a perspective view of second embodiment of a lock assembly.

To further ensure no one uses the brackets who isn't authorized to, the channel can be blocked with a locking cable that is woven through the apertures in the brackets. The cable can be a single-pass system in which an end stop such as a rod or washer is attached to one end of the cable which prevents the cable from being pulled through the apertures of the brackets. A padlock would be attached to the opposite end. Alternatively the cable can form a loop on itself, closed by a padlock. Alternatively the channel can be blocked with a sliding lock bar 71. See FIGS. 7A and 7B. The lock bar 71 is a piece of metal or plastic that slides from the top down through the channel. It may shield the bolt 12 from tools that might be used to remove it and has an aperture at the bottom though which a padlock shackle can be inserted to prevent the lock bar 71 from being pulled out.

In use, a hunter mounts brackets in the locations he desires. The brackets can be removed by unscrewing the bolt to allow for tree growth, although the brackets can be left in place permanently and are preferably made of weather- and rust-resistant materials to do so. The hunter attaches his proprietary mounts to the brackets as desired, thereby removably attaching equipment to the tree stand. The hunter may remove the mounts, leaving the brackets, thereby preventing others from using his tree stand.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of this description.

The invention claimed is:

1. An assembly for mounting equipment to a tree, the assembly comprising:
 a. a bracket for attachment to a tree, the bracket having a first mount aperture for receiving a first extension and a second mount aperture for receiving a second extension; and
 b. a resilient mount having a first extension that is configured to fit in the first mount aperture and a second extension that is configured to fit in the second mount aperture to removably secure the mount to the bracket after the bracket is attached to the tree, wherein the mount further comprises:
  i. a trigger; and
  ii. a nub extending from the trigger, the nub configured to be disposed in the second mount aperture with the second extension when the mount is attached to the bracket.

2. The assembly of claim 1 wherein the bracket has an additional plurality of mount apertures for receiving a plurality of mounts.

3. The assembly of claim 1 wherein the bracket further comprises a bolt aperture for receiving a bolt wherein the bolt is inserted through the bolt aperture to secure the bracket to the tree.

4. The assembly of claim 1 wherein the assembly further comprises a strap aperture for receiving a strap, wherein the strap is inserted through the strap aperture to secure the bracket to the tree.

5. The assembly of claim 1 wherein the bracket further comprises at least one cleat that is configured to stabilize the bracket against the tree.

6. The assembly of claim 1 wherein the first extension and second extension break when impacted by a force of over 1500 lbs.

7. The assembly of claim 1 wherein the mount comprises a step.

8. The assembly of claim 1 wherein the mount is not a step.

9. The assembly of claim 1 wherein the mount comprises a right triangle having a base, a leg, and a hypotenuse, wherein the first extension extends from the base of the triangle near the leg of the triangle.

10. The assembly of claim 9 wherein the mount:
 a. is a step; and
 b. the leg is a stepping surface further comprising gripping structures to provide traction for a foot stepping on it.

11. The assembly of claim 9 wherein the base is discontinuous between the first extension and the second extension.

12. The assembly of claim 1 wherein when the trigger is pulled, the nub is pulled out of the second mount aperture thereby releasing the first and second extensions from the first and second mount apertures, respectively.

13. The assembly of claim 1 further comprising at least one projection attached to the bracket, wherein the projection causes the bracket to be spaced a distance from the tree.

14. An assembly for mounting equipment to a tree, the assembly comprising:
 i. a bracket for attachment to a tree, the bracket having a first mount aperture for receiving a first extension and a second mount aperture for receiving a second extension; and
 ii. a trigger connected to the leg and disposed in a space between the leg and the hypotenuse;
 iii. a nub extending from the trigger, the nub configured to be disposed in the second mount aperture with the second extension when the step is attached to the bracket; and
 b. at least two steps wherein each step comprises:
 i. a right triangle having a base, a leg, and a hypotenuse, wherein the first extension extends from the base near the leg, the second extension extends from the base near the hypotenuse, and the base is discontinuous between the first extension and the second extension; and
 ii. a stepping surface comprising the leg, wherein the leg comprises gripping structures to provide traction for a foot stepping on it, wherein the mount further comprises a trigger connected to the leg and disposed in a space between the leg and the hypotenuse, and further comprising a nub extending from the trigger, the nub configured to be disposed in the second mount aperture with the second extension when the step is attached to the bracket.

* * * * *